3,007,948
PROCESS FOR THE PRODUCTION OF 2-TRI-FLUOROMETHYL-4-AMINO-5-SULFAMYL-BENZENESULFONAMIDE

David A. Johnson, Syracuse, N.Y., assignor, by mesne assignments, to Bristol-Myers Company, New York, N.Y., a corporation of Delaware
No Drawing. Filed June 15, 1959, Ser. No. 820,127
2 Claims. (Cl. 260—397.7)

This invention relates to a novel and highly efficient method of preparing 2-trifluoromethyl-4-amino-5-sulfamylbenzenesulfonamide in a single reaction from commercially available reagents.

This application is a continuation-in-part of my prior, copending application, Serial No. 790,331, filed February 2, 1959, now abandoned.

In the past, natriuretic agents useful in the therapy of hypertension and edematous states, e.g., 6-trifluoromethyl-7-sulfamyl-3,4-dihydro-1,2,4-benzothiadiazine-1,1-dioxide and 6-trifluoromethyl-7-sulfamyl-1,2,4-benzothiadiazine-1,1-dioxide have been prepared by treatment of the present intermediate (2-trifluoromethyl-4-amino-5-sulfamylbenzenesulfonamide, also called 2,4-disulfamyl-5-trifluoromethylaniline) with formaldehyde and formic acid respectively. The present intermediate, however, could only be prepared in low yield by a laborious and inefficient six-step synthesis.

It is the object of the present invention to provide an efficient, unitary process for the production of 2-trifluoromethyl-4-amino-5-sulfamylbenzene-sulfonamide.

The object of the present invention has been achieved by the provision of the unitary process for preparing 2-trifluoromethyl-4-amino-5-sulfamylbenzene-sulfonamide which comprises reacting m-aminobenzotrifluoride with at least 4 moles chlorosulfonic acid and at least 4 moles sodium chloride in tetrachloroethane at a temperature of at least 90° C., and treating the reaction mixture with aqueous ammonia. If desired, the reaction mixture containing the intermediate disulfonyl chloride may be first quenched with water and the solvent layer then separated and treated with ammonia, or preferably concentrated ammonium hydroxide, to produce the final product in solution in the aqueous phase.

A particular embodiment of the present invention is the unitary process for preparing 2-trifluoromethyl-4-amino-5-sulfamylbenzene-sulfonamide which comprises reacting m-aminobenzotrifluoride with about 10–20 moles chlorosulfonic acid and about 10–20 moles sodium chloride in tetrachloroethane at a temperature of about 120° C., quenching the reaction mixture with water and treating the reaction mixture with ammonia.

The process of the present invention comprises the reaction of commercially available m-aminobenzotrifluoride, e.g., one mole, with at least 4 moles, and preferably 12 or about 10–20 moles, chlorosulfonic acid and at least 4 moles, and preferably about 12 moles, sodium chloride in the particular solvent tetrachloroethane (using about 200–4,000 ml. solvent, and preferably about 2,000 ml. of solvent per mole of m-aminobenzotrifluoride) followed by treatment with ammonia (as such or in the form of ammonium hydroxide) to produce 2-trifluoromethyl-4-amino-5-sulfamylbenzene-sulfonamide. To achieve practical results, the sulfonation reaction is carried out at a temperature of at least 90° C. and preferably at about 120° C. or 130° C. Higher temperatures than about 135° C. can be used but are not preferred as they necessitate conducting the reaction in a closed vessel under pressure. The use of the solvent, tetrachloroethane, is essential and no other solvent has been found to be satisfactory at all.

Additional details are given in the following examples, which are illustrative only and not to be construed in limitation.

Example 1

To a reaction vessel chilled in an ice bath there is added 750 ml. (11.5 moles) chlorosulfonic acid and 1500 ml. tetrachloroethane. m-Aminobenzotrifluoride (130 ml., 161 g., 1.0 mole) is then added slowly with stirring over a 15-minute period. The ice bath is removed and 700 g. (12 moles) sodium chloride is added slowly with stirring over a period of 20–30 minutes. The reaction mixture is then stirred and heated slowly to 120° C. (e.g. over one hour), held at 120° C. for about 30 minutes (and if desired held an additional 30 minutes at 130° C.) and then cooled as rapidly as possible to 30° C. or less. The reaction mixture is quenched by pouring rapidly on a stirred mixture of 4.5 l. ice cubes, plus 3 l. cold water with the temperature of the quench mixture being kept below 20° C. The mixture is then stirred for 15 minutes and filtered. The filtrate (A) is separated and the solvent layer (S–1) and water layer (W–1) are saved. The tarry cake is slurried in 500 ml. tetrachloroethane to remove adhering rich solvent and product. This mixture is then filtered and the solvent phase (S–2) is stirred with previous water phase W–1. The solvent layer is separated and added to solvent phase S–1. The combined solvent phases are extracted three times with concentrated (28%) ammonium hydroxide (500 ml., 250 ml., 250 ml.). The aqueous phases containing the product are separated each time, combined and heated under mild vacuum for about one hour to drive off the ammonia. The product 2-trifluoromethyl-4-amino-5-sulfamylbenzenesulfonamide then crystallizes out and, after cooling in ice, is collected by filtration, washed with water, dried in an oven at 70° C. and found to weigh 65–70 g. and to melt at 230°–240° C.

As an illustration of the many types of compounds which are prepared by the use of 2-trifluoromethyl-4-amino-5-sulfamylbenzenesulfonamide as the starting reagent, 6-trifluoromethyl-7-sulfamyl-3,4-dihydro-1,2,4-benzothiadiazine-1,1-dioxide is prepared in the following manner. Sodium hydroxide (1.2 g., 0.03 mole) and 2,4-disulfamyl-5-trifluoromethylaniline (9.6 g., 0.03 mole) in 75 ml. dioxane were warmed on the steam bath while a total of 30 ml. water was added to give a nearly clear solution which was then cooled in ice during the addition of 40% aqueous formaldehyde (2.47 g., or 0.03 mole formaldehyde plus 10% excess). Water (3 ml.) was used to rinse the last formaldehyde into the reaction mixture. After standing at room temperature for 1.5 hours, the mixture was heated to reflux for 3.5 hours and then allowed to stand overnight at room temperature without apparent change. Removal of the dioxane by distillation in vacuo then left the product as a gum to which 50 ml. water was added to give an aqueous mixture from which crystalline 6-trifluoromethyl-7-sulfamyl-3,4-dihydro-1,2,4-benzothiadiazine-1,1-dioxide precipitated and was collected by filtration. Two recrystallizations of this material from water (10–15 ml.) plus sufficient 95% ethanol added at the boiling point to give solution gave product melting after air-drying at 260°–264° C. (observed, 269°–273° C. corrected).

In another instance, the 6-trifluoromethyl-7-sulfamyl-1,2,4-benzothiadiazine-1,1-dioxide is prepared as follows: Formic acid (98%, 4 ml.) and 1 g. 2,4-disulfamyl-5-trifluoromethylaniline were mixed and heated at reflux for 4 hours. A single phase solution was quickly obtained. On cooling to room temperature, crystals of the product, 6-trifluoromethyl-7-sulfamyl-1,2,4-benzothiadiazine-1,1-dioxide, separated and were collected by filtration and found to melt at 296°–298° C. (301°–303° C. corrected) when the melting point was taken on an aluminum block heated with a Bunsen burner. The product was recrystallized from a mixture of equal volumes of water and ethanol, dried in a vacuum desiccator over $P_2O_5$ and found to melt at 300°–302° C. observed (305°–307° C. corrected) and to be insoluble in water and soluble in dilute aqueous sodium bicarbonate, forming the sodio salt.

*Example 2* m-Aminobenzotrifluoride (1.0 mole) 3500 ml. tetrachloroethane and 14.0 moles sodium chloride are mixed and heated to 120° C. over about thirty minutes. Chlorosulfonic acid (12.4 moles) is added continuously over a two-hour period at 120° C. with agitation. The reaction mixture is then maintained at 120–130° C. for an additional ninety minutes. After cooling to 50° C., the reaction mixture is quenched in 3000 ml. water while maintaining the temperature at 30° C. and stirring for thirty minutes. The tetrachloroethane phase containing the 2,4-disulfonyl-5-trifluoromethyl-aniline dichloride is then separated and is ready for use.

For example, this reagent in tetrachloroethane after quenching is converted to 2-trifluoromethyl-4-amino-5-sulfamyl-benzenesulfonamide (DSA) by extracting with 1800 ml. of concentrated ammonium hydroxide for thrity minutes. The aqueous phase is then separated and distilled in vacuo with addition of water to maintain the volume until the pH is between 5 and 6. The resulting slurry of crystalline DSA is stored overnight at room temperature, collected by filtration, washed with 1.0 l. cold water and dried at 70° C. to give an overall yield from starting m-aminobenzotrifluoride of 70–78% of high quality material (M.P. 240–247° C., assaying 95–98% pure DSA). When the amount of amine is increased 20% while holding other factors constant, the yield is 71%, an increase in productivity of 14.5%. The overall yield from starting m-aminobenzotrifluoride was 43–44% when all the chlorosulfonic acid was added at the beginning of the reaction.

No DSA at all was obtained in the process of the above example when the tetrachloroethane was replaced by diisobutyl ketone, a nonaromatic hydrocarbon fraction of B.P. about 160° C. (Shell Sol #360), trichloroethane, tetrachloroethylene, propylene dichloride and orthodichlorobenzene respectively. Even the use of dichloroethane gave greatly reduced yields consisting primarily of the monosulfonamide. The rate of agitation was not important. Use of only about half as many moles of sodium chloride as of chlorosulfonic acid gave lesser but useful yields of DSA. Particle size of the sodium chloride had no effect on yield; successful use was made, for example, of rock salt (90% over 16 mesh), 35 mesh rock salt and pulverized salt. Small but useful yields were obtained when the sodium chloride was replaced by potassium chloride or lithium chloride. No product was obtained when the sodium chloride was replaced by magnesium chloride or calcium chloride.

Larger volumes of quench water could be used if they contained sodium chloride, e.g. 5 kg. in 20 l. There was no significant variation in yield when the quenching process was varied between 4° C. and 20° C. as to temperature and between 45 minutes and five hours as to time.

I claim:

1. The unitary process for preparing 2-trifluoromethyl-4-amino-5-sulfamylbenzene-sulfonamide which comprises mixing m-trifluoromethylaniline with 10–20 moles chlorosulfonic acid (per mole of m-trifluoromethylaniline and 10–20 moles sodium chloride (per mole of m-trifluoromethylaniline) in tetrachloroethane at a temperature of 120°–135° C., quenching the reaction mixture with water, separating the tetrachloroethane phase and contacting said solvent phase with excess ammonia.

2. The unitary process for preparing 2-trifluoromethyl-4-amino-5-sulfamylbenzene-sulfonamide which comprises heating a mixture in tetrachloroethane of m-trifluoromethylaniline with about twelves moles sodium chloride (per mole of m-trifluoromethylaniline) to about 120° C. and then slowly adding about twelve moles chlorosulfonic acid (per mole of m-trifluoromethylaniline) while maintaining the reaction mixture at a temperature of 120°–135° C. and then quenching the reaction mixture in water below 30° C. and separating the phases to provide a solution of 2,4-disulfonyl-5-trifluoromethylaniline dichloride in tetrachloroethane and then contacting said solution with aqueous ammonia.

References Cited in the file of this patent

UNITED STATES PATENTS

| | | |
|---|---|---|
| 2,511,547 | Seymour et al. | June 13, 1950 |
| 2,794,833 | Merian | June 4, 1957 |
| 2,809,194 | Novello | Oct. 8, 1957 |
| 2,826,594 | Dreisbach | Mar. 11, 1958 |
| 2,834,793 | Livingston et al. | May 13, 1958 |
| 2,910,473 | Novello | Oct. 27, 1959 |

OTHER REFERENCES

Morgan et al.: J. Am. Chem. Soc., vol. 70, page 375 (1948).

Low et al.: J. Am. Chem. Soc., vol. 72, page 5717 (1950).

Hatch: Pet. Refiner, vol. 33, No. 12, pages 136–40 (1954).